UNITED STATES PATENT OFFICE 2,069,159

SUBSTITUTED AMINOCHRYSENES

Werner Schultheis, Frankfort-on-the-Main-Hochst, and Gerhard Langbein, Hofheim in Taunus, Germany, assignors to General Aniline Works, Inc., New York, N. Y., a corporation of Delaware No Drawing. Application December 18, 1934, Serial No. 758,108. In Germany December 22, 1933

4 Claims. (Cl. 260—124)

We have found that substituted aminochrysenes may be obtained by treating dinitrochrysenes with agents having a reducing action. By suitably working, it is possible to reduce one nitro-group only or both nitro-groups. There are thus obtained amino-nitrochrysenes and, by further reduction, diaminochrysenes. It is also possible to obtain substituted aminochrysenes by starting from monoaminochrysenes wherein the amino-group is protected in known manner, for instance, by an acyl-group such as an acetyl, benzoyl or naphthoyl group. By treating, for instance, an acetaminochrysene with a nitrating agent, an acetaminonitrochrysene is obtained. The latter may either be treated with a saponifying agent and thus be converted into an aminonitrochrysene which may be reduced to a diamino compound, or it may be treated with a reducing agent and thus be transformed into an acetamino-aminochrysene which may easily be saponified to the same diamino compound.

The aminochrysenes obtainable according to the present invention are new. There are obtained, for instance, compounds of the following general formula

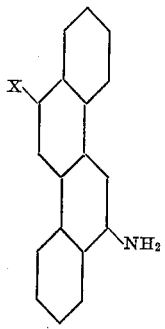

wherein X means NO₂, NH₂ or NH-acyl.

The aminochrysenes are valuable intermediates for the manufacture of dyestuffs and pharmaceutical products.

The following examples serve to illustrate the invention, but they are not intended to limit it thereto, the parts are by weight:

(1) 20 parts of dinitrochrysene [obtainable by boiling for several hours 3 parts of chrysene and 2 parts of nitric acid (specific gravity=1.5) in glacial acetic acid] are suspended in 500 parts of alcohol. A solution of 160 parts of crystallized sodium sulfide in a small quantity of water is slowly run thereinto at boiling temperature. After one hour the alcohol is distilled off and water is added to the remaining mass. The di-aminochrysene which has separated is filtered with suction, dried and recrystallized from chlorobenzene. It is obtained in the form of long yellow needles, melting at 284° C. to 286° C.

(2) 31.8 parts of dinitrochrysene (obtainable as described in Example 1) are suspended in 600 parts of alcohol. At boiling temperature, a solution of 24 parts of crystallized sodium sulfide and 3.2 parts of sulfur in 20 parts of water is slowly added thereto, drop by drop, and the whole is boiled for several hours while stirring. Amino-nitrochrysene separates. It is filtered with suction and crystallized from chlorobenzene. Red-orange needles, melting at 228° C. to 229° C., are obtained.

(3) 20 parts of aminonitrochrysene, obtainable as described in Example 2, are reduced in 200 parts of pyridine with hydrogen in the presence of finely divided nickel in an autoclave at 70° C. to 80° C. and thus transformed into diamino-chrysene. When recrystallized from chlorobenzene, the diaminochrysene is obtained in the form of yellow needles, melting at 284° C. to 286° C. It is identical with that obtainable as described in Example 1.

(4) 14 parts of acetaminochrysene, melting at 286° C. to 288° C., are suspended in 250 parts of glacial acetic acid. 4 parts of nitric acid (specific gravity=1.5) are added, drop by drop, at room temperature. The whole is heated for ½ hour at 70° C. to 80° C., cooled and the acetaminonitro-chrysene is filtered with suction. When recrystallized from nitrobenzene it is obtained in the form of golden-yellow needles, melting at 322° C. to 325° C.

(5) 50 parts of acetamino-nitrochrysene, obtainable as described in Example 4, are boiled, while stirring, for several hours in 1000 parts of alcohol with 70 parts of caustic soda solution of 40° Bé. After cooling, the aminonitrochrysene is filtered with suction. When recrystallized from chlorobenzene, it is obtained in the form of orange-red needles, melting at 228° C. to 229° C. It is identical with the product obtained as described in Example 2.

(6) 20 parts of acetaminonitrochrysene, obtainable as described in Example 4, are reduced in 200 parts of pyridine with hydrogen, in the presence of finely divided nickel in an autoclave at 70° C. to 90° C. The solution thus obtained is separated from the catalyzer and the acetami-noaminochrysene is precipitated by means of water. It crystallizes from glacial acetic acid in the form of colorless glittering small leaflets, melting at 266° C. to 268° C.

(7) 20 parts of acetaminoaminochrysene, obtainable as described in Example 6, are boiled for several hours in 300 parts of alcohol with 40 parts of caustic soda solution of 40° Bé. The solid matter is filtered with suction, washed with water, dried and the diaminochrysene, thus obtained, is recrystallized from chlorobenzene. It melts at 284° C. to 286° C. and is identical with that obtainable as described in Example 1.

We claim:

1. The compounds of the general formula:

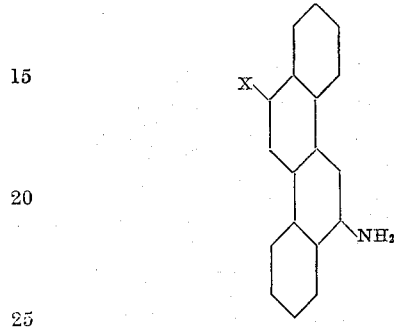

wherein X represents a member selected from the group consisting of $NO_2$, $NH_2$ and NH-acyl.

2. The compound of the formula:

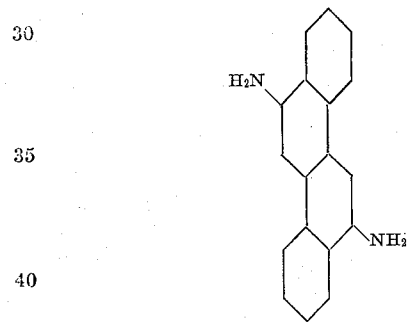

crystallizing from chlorobenzene in the form of long yellow needles, melting at 284° C. to 286° C.

3. The compound of the formula:

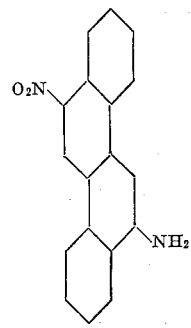

crystallizing from chlorobenzene in the form of reddish-orange needles, melting at 228° C. to 229° C.

4. The compound of the formula:

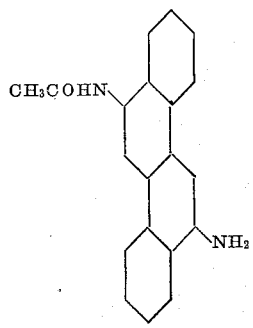

crystallizing from glacial acetic acid in the form of colorless glittering small leaflets, melting at 266° C. to 268° C.

WERNER SCHULTHEIS.
GERHARD LANGBEIN.